March 13, 1934.  A. F. STERNAD  1,950,525
MACHINE FOR ROLLING CORE SOLDER
Filed July 17, 1930  4 Sheets-Sheet 1

March 13, 1934.  A. F. STERNAD  1,950,525
MACHINE FOR ROLLING CORE SOLDER
Filed July 17, 1930   4 Sheets-Sheet 2
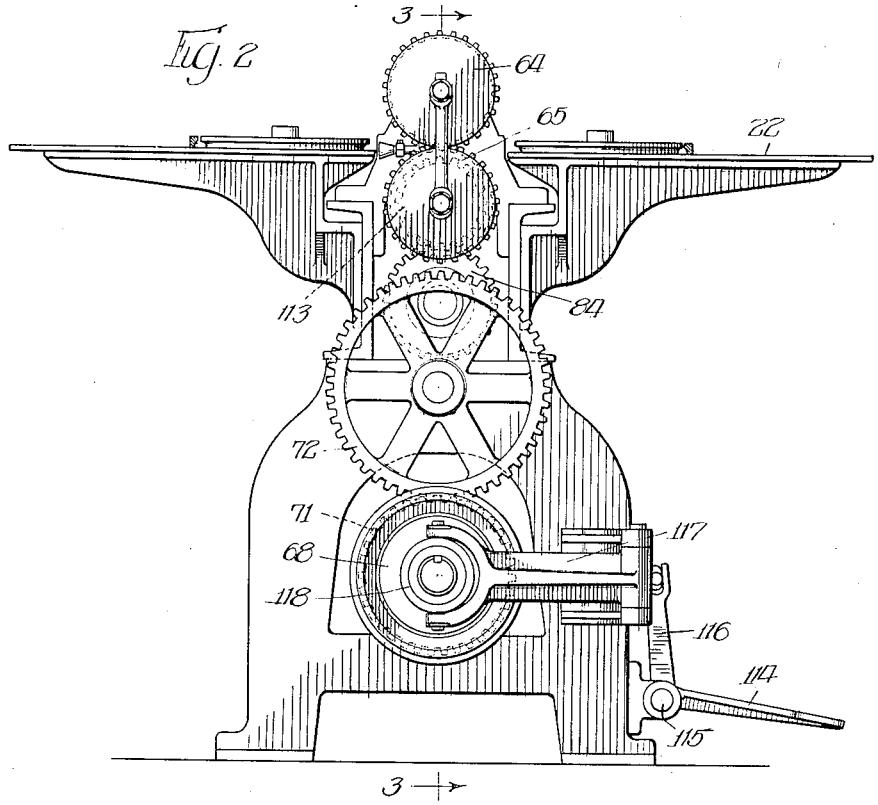
Fig. 2
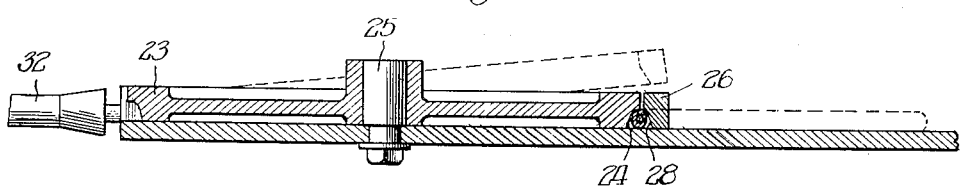
Fig. 9
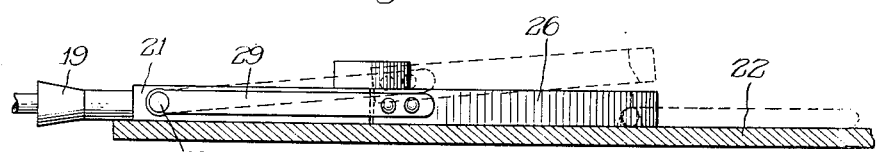
Fig. 10
Fig. 11  Fig. 12  Fig. 13  Fig. 14
   
Inventor:
Andrew F. Sternad
By Cromwell, Greist & Warden
Atty's

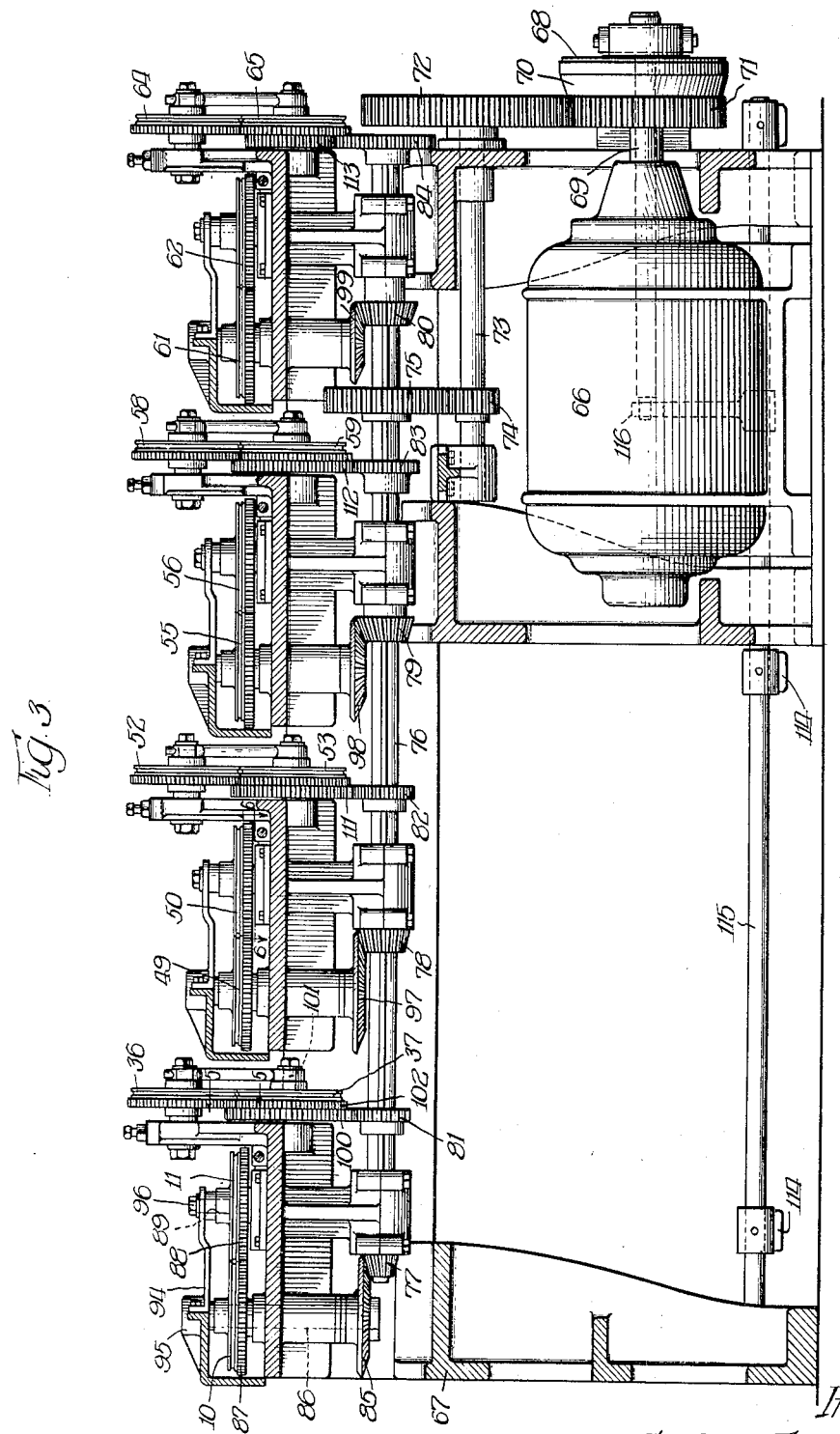

March 13, 1934.  A. F. STERNAD  1,950,525
MACHINE FOR ROLLING CORE SOLDER
Filed July 17, 1930   4 Sheets-Sheet 4
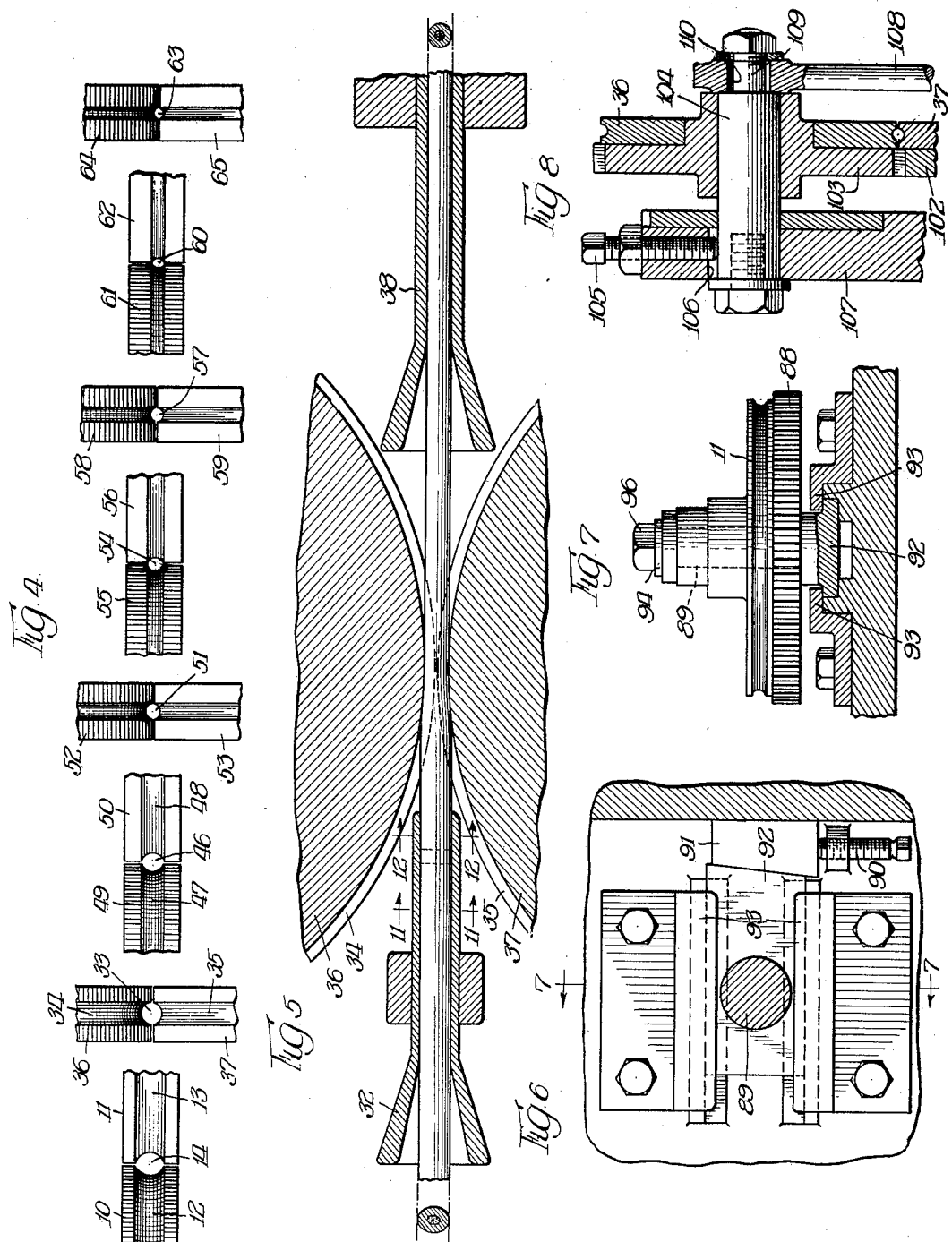
Inventor:
Andrew F. Sternad,
By Cromwell, Greist & Warden
Attys.

Patented Mar. 13, 1934

1,950,525

UNITED STATES PATENT OFFICE 1,950,525

MACHINE FOR ROLLING CORE SOLDER

Andrew F. Sternad, Chicago, Ill., assignor to Gardiner Metal Co., Chicago, Ill., a corporation of Illinois Application July 17, 1930, Serial No. 468,684

1 Claim. (Cl. 80—37)

Heretofore it has been the practice, in reducing core solder from the relatively large diameter in which it is first formed to the relatively small diameter in which it is used, to draw the solder through a series of progressively smaller dies, but such procedure is extremely slow, tedious and difficult, owing to the fact that solder which has a core of acid, rosin or other soft material will not hold its shape and is very hard to control.

One of the objects of the present invention is to provide a novel machine which will roll, as distinguished from draw, core solder to the desired diameter, and will do so automatically at a high rate of speed.

Another object of the invention is to provide a novel method of reducing core solder by rolling.

While the foregoing statements are indicative in a general way of the nature of the invention, other objects and advantages will be evident to those skilled in the art upon a full understanding of the construction, arrangement and operation of the new machine.

In order that the invention may be readily understood, one form of the same is presented herein, but it will of course be appreciated that the invention is capable of being embodied in other structurally modified forms coming equally within the scope of the appended claim.

In the accompanying drawings:

Fig. 2 is an end view of the machine;

Fig. 3 is a vertical longitudinal section through the machine, taken on the line 3—3 of Fig. 1 and the line 3—3 of Fig. 2;

Fig. 4 is a contracted and fragmentary side view of the meeting portions only of the series of pairs of shaping rolls in the machine;

Fig. 5 is a fragmentary vertical section through the first pair of vertical rolls, taken on the line 5—5 of Fig. 3;

Fig. 6 is a fragmentary horizontal section through the adjustable journaling shaft of one of the pairs of horizontal rolls, taken on the line 6—6 of Fig. 3;

Fig. 7 is a fragmentary vertical section, taken on the line 7—7 of Fig. 6;

Fig. 8 is a fragmentary vertical section through the adjustable journaling shaft of one of the pairs of vertical rolls, taken on the line 8—8 of Fig. 1;

Fig. 9 is a fragmentary vertical section through one of the yieldable solder guides, taken on the line 9—9 of Fig. 1;

Fig. 10 is an edge view of the guide shown in Fig. 9;

Fig. 11 is a fragmentary vertical section, taken on the line 11—11 of Fig. 5;

Fig. 12 is a similar section, taken on the line 12—12 of Fig. 5;

Fig. 13 is a sectional view of the solder before being rolled; and

Fig. 14 is a sectional view through the same solder after being rolled.

Figure 1:
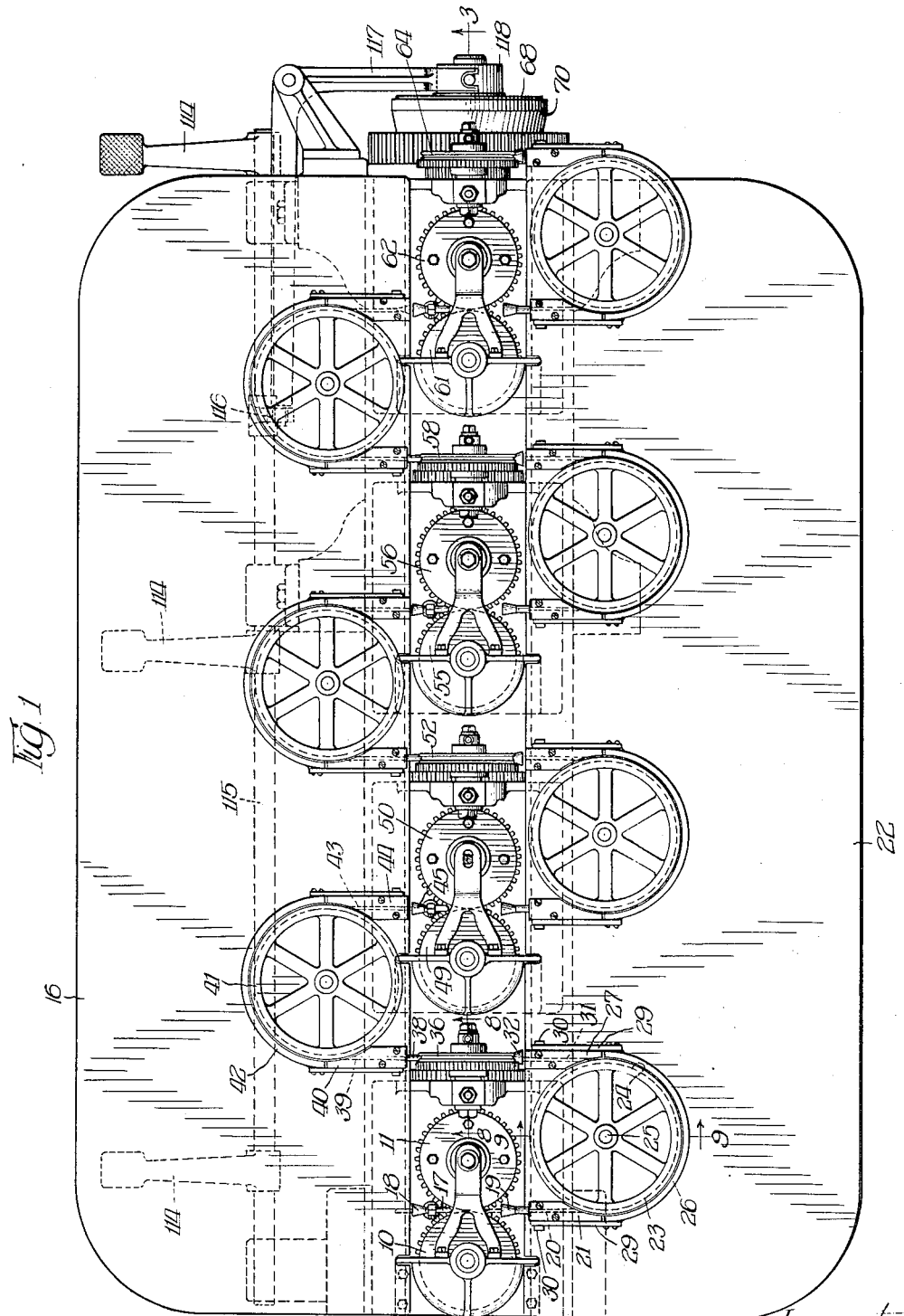
Fig. 1 is a plan view of the machine of the invention.

The machine shown in the drawings is characterized by a row of narrow reducing rolls which are arranged in pairs in alternately horizontal and vertical positions. The rolls in each pair are disposed in the same plane in substantially tangential relation to each other and are provided in their peripheries with annular grooves which register with each other to form a shaping pass therebetween for the solder.

The first pair of rolls 10 and 11 are positioned horizontally along the center line of the machine and are provided with grooves 12 and 13 which are so proportioned as to form an oval-shaped pass 14 therebetween. The pass 14, which is clearly shown in Fig. 4, extends at right angles to the center line of the machine and is vertically elongated in cross-section. The major cross-sectional axis of the pass 14 is greater than the initial diameter of the solder 15 which is to be fed to the machine, while the minor cross-sectional axis of the pass is somewhat less than the diameter of the solder, whereby to cause the solder when it is fed through the pass to become oval in cross-section and greater in length without the formation of any thin fin-like extrusions on the sides thereof. The rolls 10 and 11 are positively driven in opposite directions at the same rate of speed by means which will hereinafter be described.

The solder, in approaching the pass 14 between the rolls 10 and 11, preferably travels across the surface of a wide horizontal platform 16 which is arranged at substantially the same height as the pass and extends along one side of the machine the full length of the latter. A guide tube 17 is positioned closely adjacent the pass 14 in axial alignment therewith, and is provided with an enlarged conical end 18 into which the solder is introduced. The other end of the tube 17 terminates just short of the point of approximate tangency between the rolls, and the solder, upon leaving the tube, enters the center of the pass 14, where it is forced into oval form and lengthened out.

Upon leaving the pass 14, the solder enters another conical-ended guided tube 19 and is directed by such tube into a passageway 20 in a block 21. As will be observed in Fig. 1, the guide tube 17, the pass 14, the guide tube 19 and the passageway 20 are all arranged in axial alignment with each other. From the passageway 20, the solder runs out upon the surface of a wide horizontal platform 22 similar to the platform 16 and travels horizontally through an angle of 180° around the periphery of a guide wheel 23 in a groove 24 formed in the lower portion of the edge of the latter. The wheel 23 rotates freely on a spindle 25 and rests flatly upon the platform 22 with the groove 24 in tangential relation to the passageway 20 in the block 21. The solder is caused to bend about the periphery of the wheel 23 by a curved guard 26 which extends 180° about the periphery of the wheel from the block 21 to another block 27. The lower inside edge of the guard 26 is beveled at 28 where it engages with the solder, and the ends of the guard are attached to two parallel strips 29 which are pivoted to the blocks 21 and 27 at 30. When the solder reaches the block 27, it enters a passageway 31 in the latter and is directed into a conical-ended guide tube 32.

The guide tube 32 is arranged in axial alignment with a pass 33 which is formed between the grooves 34 and 35 in the second pair of rolls 36 and 37. The rolls 36 and 37 are positioned vertically one above the other on the center line of the machine, and the pass 33, like the pass 14, extends horizontally at right angles to the center line of the machine, in longitudinally spaced parallel relation to the pass 14. The pass 33, which is clearly shown in Fig. 4, is round in cross-section as distinguished from oval, and is a little larger in diameter than the minor cross-sectional axis of the oval solder approaching the pass through the tube 32. The pass 33 causes the solder to become substantially round in cross-section again, but the solder, when thus rounded, is considerably smaller and much longer than it was before it entered the first pass 14. The opening in the guide tube 32 is circular in cross-section throughout the greater portion of its length but is oval in cross-section for a short distance adjacent its discharge end, whereby to fit the solder snugly and guide the latter accurately into the center of the pass 33.

The solder is drawn toward the first pair of rolls 10 and 11 at substantially the linear speed of those rolls but leaves the latter at a greater speed by reason of its elongation, which elongation is approximately eight inches per revolution. To compensate for this increase in speed or elongation, the second pair of rolls 36 and 37 are caused to rotate at a proportionately higher speed than the first pair, by means which will hereinafter be described. Should the solder, in traveling about the guide wheel 23 from the first pair of rolls to the second pair, become temporarily elongated for any reason to a greater degree than contemplated, it will cam up the pivoted guard 26, as shown in dotted lines in Figs. 9 and 10, and will ride out onto the platform in a wide loop until such time as the slack therein is reduced enough to allow the guard to drop back into place.

Upon leaving the pass 33, the then rounded solder moves into a conical-ended guide tube 38. From the tube 38, the solder travels through an aligned passageway 39 in a block 40, around a guide wheel 41 between the periphery of the latter and a pivoted guard 42, through a passageway 43 in a block 44, and then through a guide tube 45 into the third pass 46, which pass is formed between the grooves 47 and 48 in the third pair of rolls 49 and 50. The tube 38, passageway 39, block 40, wheel 41, guard 42, passageway 43, block 44 and tube 45 are respectively similar in construction and operation to the previously described tube 19, passageway 20, block 21, wheel 23, guard 26, passageway 31, block 27 and tube 32, except that they are arranged at the opposite side of the machine and the opening in the tube 45, instead of being partially oval, in cross section, is rounded throughout its length to fit the rounded solder.

The third pair of rolls 49 and 50, like the first pair 10 and 11, are arranged horizontally along the center line of the machine, and the pass 46 therebetween is oval in cross-section. The pass 46, which is clearly shown in Fig. 4, is arranged with its major cross-sectional axis in an upright position, and differs from the first pass 14 only in that its cross sectional area is considerably smaller, the major cross-sectional axis thereof being but slightly larger than the diameter of the rounded second pass 33.

From the pass 46, the solder, continuing its tortuous travel, moves through a rounded pass 51 between the grooved peripheries of the fourth pair of rolls 52 and 53, then through an oval pass 54 between the fifth pair of rolls 55 and 56, then through a rounded pass 57 between the sixth pair of rolls 58 and 59, then through an oval pass 60 between the seventh pair of rolls 61 and 62, and finally through a rounded finishing pass 63 between the eighth pair of rolls 64 and 65. Each of the oval passes bears substantially the same proportion to the preceding rounded pass as the pass 46 bears to the pass 33, and each of the rounded passes likewise bears substantially the same proportion to the preceding oval pass as the pass 33 bears to the pass 14. All of the passes are disposed in the same horizontal plane and extend at right angles to the center line of the machine, and the solder, from the time that it enters the pass 14 to the time that it leaves the pass 63, winds back and forth in a horizontal plane. From the pass 63, the solder may be formed into small open center coils or wound onto spools, ready for packaging.

All of the rolls which are used in reducing and elongating the solder are driven by a motor 66 which is mounted in the lower portion of the frame 67 of the machine at a point adjacent one end of the latter. A cone-shaped clutch member 68 is splined to the armature shaft 69 of the motor and is adapted upon axial movement to engage with an encompassing cone-shaped clutch member 70 which carries a gear 71. The gear 71 meshes upwardly with a gear 72 which is attached to a countershaft 73, and the countershaft 73 carries a pinion 74 which meshes upwardly with a gear 75 which is keyed to a long shaft 76. The shaft 76 carries four different sized bevel pinions 77, 78, 79 and 80 and four different sized spur pinions 81, 82, 83 and 84.

The first bevel pinion 77 is attached to the shaft 76 beneath the first pair of rolls 10 and 11 and meshes with a bevel gear 85 which is attached to a vertically extending shaft 86, and the roll 10 is secured to the upper end of the shaft 86. The shaft 86 carries the roll 10 and also carries a gear 87 immediately beneath the roll 10, which gear meshes with a similar gear 88 which is journaled on a vertical stub shaft 89 and is attached to the roll 11 beneath the latter. The stub shaft 89 is adjustable toward or away from the shaft 86 by means of a set screw 90 which engages with a wedge block 91. When the screw 90 is turned inwardly, the block 91 cams against a beveled surface on one end of a bracket 92, which bracket carries the stub shaft 89 and is mounted in spaced parallel ways 93. By moving the spindle 89 toward or away from the shaft 86, the size of the pass 14 may be correspondingly decreased or increased without affecting the inter-meshing relation of the gears 87 and 88. After the stub shaft 89 has been adjusted to the desired position, the upper end of the same may be locked against retraction by means of a tie rod 94 which is attached at one end to a rigid member 95 in which the upper end of the shaft 86 is journaled and is adjustably attached at the other end to the stub shaft 89 by a clamping screw 96 which extends through an elongated slot in the tie rod 94 into the upper end of the stub shaft 89.

The other bevel pinions 78, 79 and 80 are progressively larger than the pinion 77 and mesh with bevel gears 97, 98 and 99 which are progressively smaller than the gear 85. The third, fifth and seventh pairs of rolls are driven by the bevel gears 97, 98 and 99 respectively in the same way that the first pair of rolls are driven by the bevel gear 85. The first spur pinion 81 is attached to the shaft 76 beneath the second pair of rolls 36 and 37 and meshes with a spur gear 100 which is journaled on a horizontal stub shaft 101. A gear 102 is secured concentrically to the gear 100 and the lower roll 37 in the second pair is secured concentrically to the gear 102. The gear 102 meshes with a similar gear 103 which is journaled on a stub shaft 104, and the upper roll 36 in the second pair is secured concentrically to the gear 103. The stub shaft 104 is adjustable toward or away from the stub shaft 101 by means of a set screw 105 which extends into an elongated slot 106 in a bracket 197 and engages with one end of the stub shaft 104. After the desired adjustment has been effected, the other end of the stub shaft 104 is locked in position by means of a tie rod 108 which is fastened at its lower end to the end of the stub shaft 101 and is adjustably attached at its upper end to the stub shaft 104 by a clamping bolt 109 which extends through an elongated slot 110 in the tie rod.

The other spur pinions 82, 83 and 84 are progressively larger than the pinion 81 and mesh with spur gears 111, 112 and 113 which are progressively smaller than the gear 100. The fourth, sixth and eighth pairs of rolls are driven by the spur gears 111, 112 and 113 in the same way that the second pair of rolls are driven by the spur gear 100.

The clutch member 68 which is used to throw the machine into and out of operation is actuated from any one of several spaced foot pedals 114 which are attached to a rock shaft 115. The shaft 115 extends substantially the full length of the machine at one side of the bottom of the same and is connected by an arm 116 to one end of a bell-crank lever 117. The other end of the lever 117 is connected to a clutch-shifting collar 118 which is journalled on a portion of the clutch member 68. When any one of the pedals 114 are depressed, all of the shaping rolls will commence to rotate, and, when the depressed pedal is released, the rolls will come to rest.

I claim:

A machine for preparing core solder, comprising an elongated frame, a plurality of reducing rolls arranged in pairs on the frame in a row longitudinally of the latter and provided with progressively smaller passes between the rolls which are alternately oval and round and are disposed transversely of the frame in a common horizontal plane, means for positively rotating each pair of rolls with each succeeding pair traveling at an increased linear speed, wheels of the same diameter as the distance between adjoining passes mounted for free rotation in horizontal positions in tangential relation to adjoining passes, means for causing the core solder to follow the peripheries of the wheels, conduits for guiding the solder from the passes into tangential engagement with the wheels, and nozzles for guiding the solder tangentially from the wheels into the succeeding passes, the nozzles in front of the round passes having openings therein of oval cross section, and the nozzles in front of the oval passes having openings therein of round cross section.

ANDREW F. STERNAD.